United States Patent [19]
Davies et al.

[11] Patent Number: 5,235,215
[45] Date of Patent: Aug. 10, 1993

[54] MEMORY DEVICE FOR USE IN POWER CONTROL CIRCUITS

[75] Inventors: Robert B. Davies; David F. Mietus, both of Tempe; Paul T. Bennett, Phoenix, all of Ariz.

[73] Assignee: Motorola, Inc., Schaumburg, Ill.

[21] Appl. No.: 806,198

[22] Filed: Dec. 13, 1991

[51] Int. Cl.[5] .................... H03K 17/72; H03K 3/352
[52] U.S. Cl. .................... 307/284; 307/631; 307/637; 361/56; 361/91; 361/115; 365/156; 365/181
[58] Field of Search ............... 307/284, 631, 637, 640, 307/318; 365/154, 156, 180, 181; 361/54, 56, 91, 115

[56] References Cited
U.S. PATENT DOCUMENTS
4,530,023  7/1985  Brown ................... 307/640

Primary Examiner—John Zazworsky
Attorney, Agent, or Firm—Bradley J. Botsch, Sr.

[57] ABSTRACT

A memory circuit which includes a memory SCR and an output SCR is provided. The memory SCR is coupled between the input terminal and the common terminal of the memory circuit wherein the input terminal is the control terminal of the output SCR and the output SCR is coupled across the output terminal and the common terminal of the memory circuit. When the memory SCR latches, it functions to subsequently latch the output SCR. Because the output SCR has a greater forward operating voltage than the memory SCR and by providing a current path from the output terminal to the memory SCR, the memory SCR remains latched during the transition period of when the output SCR goes from a latched state to an unlatched state.

9 Claims, 1 Drawing Sheet

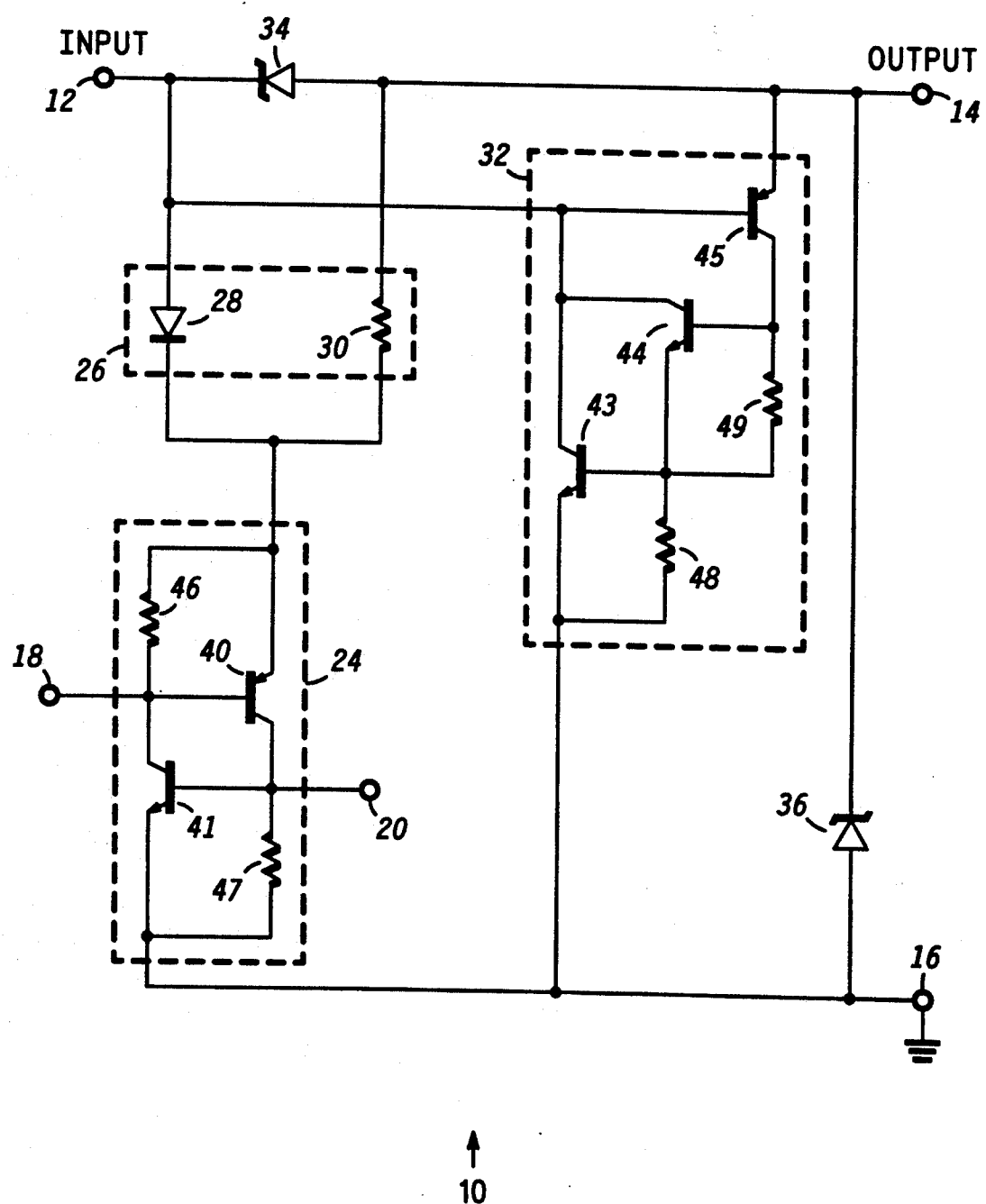

MEMORY DEVICE FOR USE IN POWER CONTROL CIRCUITS

FIELD OF THE INVENTION

This invention relates to circuits, for example, a memory device for use in power control circuits.

BACKGROUND OF THE INVENTION

Power control circuits are typically utilized to control the operation of power devices such as protecting power devices from large surge currents that could destroy the device.

One way of accomplishing this is to couple an silicon controlled rectifier (SCR) across the input capacitance of a power device. When the SCR is latched due to a predetermined condition occurring, the input capacitance of the power device is discharged, thereby decreasing the voltage across the input capacitance to a level determined by the forward on voltage of the SCR. However, once the voltage across the input capacitance decreases below the forward on voltage of the SCR, the SCR unlatches. The input capacitance is then free to be charged up again. Moreover, once the predetermined condition is satisfied again, the SCR will latch and the above process will be repeated and, thus, become oscillatory.

Hence, there is a need for an improved device for use in power control circuits that retains the memory that an SCR was latched.

SUMMARY OF THE INVENTION

Briefly, there is provided a device having an input terminal, an output terminal, a common terminal, and first and second control terminals, comprising a first SCR having first and second control terminals and first and second terminals, the first control terminal of the first SCR being responsive to a voltage appearing at the first control terminal of the device, the second control terminal of the first SCR being responsive to a voltage appearing at the second control terminal of the device, the second terminal of the first SCR being coupled to the common terminal; a second SCR having a first control terminal and first and second terminals, the first control terminal of the second SCR being coupled to the input terminal, the first terminal of the second SCR being coupled to the output terminal, the second terminal of the second SCR being coupled to the common terminal; and a transition circuit coupled to the input terminal, to the output terminal and to the first terminal of the first SCR for providing a current path from the output terminal to the first SCR when the second SCR is switching from a latched state to an unlatched state.

The present invention will be better understood from the following detailed description taken in conjunction with the accompanying drawings.

BRIEF DESCRIPTION OF THE DRAWING

The sole FIGURE is a detailed schematic diagram of a memory device for use in power control circuits.

DETAILED DESCRIPTION OF THE DRAWING

Referring to sole FIGURE, there is illustrated memory device 10 having input terminal 12, output terminal 14, and common terminal 16 and control terminals 18 and 20 whereby terminal 16 is typically coupled to ground reference. Memory device 10 also includes transition compensation circuit 26, first silicon controlled rectifier (SCR) 24 and second SCR 32. Additionally, zener diode 34 is coupled between input terminal 12 and output terminal 14, while zener diode 36 is coupled between output terminal 14 and terminal 16.

Transition compensation circuit 26 includes diode 28 and resistor 30. Diode 28 has an anode coupled to input terminal 12 and a cathode coupled to a first terminal (anode) of SCR 24. Resistor 30 is coupled between the cathode of diode 28 and output terminal 14. The second terminal of SCR 24 (cathode) is coupled to terminal 16.

SCR 24 has a first control terminal coupled to terminal 18, and a second control terminal coupled to terminal 20.

In particular, SCR 24 includes transistors 40 and 41. The collector of transistor 41 is coupled to the base of transistor 40 and to terminal 18 whereby the base of transistor 40 represents the first control terminal of SCR 24. The base of transistor 41 is coupled to the collector of transistor 40 and to terminal 20 whereby the base of transistor 41 represents the second control terminal of SCR 24. The emitter of transistor 41 is coupled to terminal 16, while the emitter of transistor 40 is coupled to the cathode of diode 28. Additionally, resistor 46 is coupled across the base and emitter of transistor 40, and resistor 47 is coupled across the base and emitter of transistor 41.

SCR 32 has a first terminal (anode) coupled to output terminal 14 and a second terminal (cathode) coupled to terminal 16. Further, a first control terminal of SCR 32 is coupled to input terminal 12.

In particular, SCR 32 includes transistors 43, 44 and 45. The emitter of transistor 43 is coupled to terminal 16, and the base of transistor 43 is coupled to the emitter of transistor 44. Further, the collector of transistor 43 is coupled to the collector of transistor 44 and to the base of transistor 45. The base of transistor 44 is coupled to the collector of transistor 45, while the emitter of transistor 45 is coupled to output terminal 14. It is understood the base of transistor 45 is the first control terminal for SCR 32. Additionally, resistor 48 is coupled across the base and emitter of transistor 43, and resistor 49 is coupled across the base and emitter of transistor 44. Resistors 48 and 49, as well as resistors 46 and 47 of SCR 24, are utilized to prevent leakage current from latching SCR's 32 and 24, respectively.

In a typical application, a capacitive load is coupled across output terminal 14 and common terminal 16. A current signal applied to input terminal 12 may be utilized to charge the voltage appearing across terminals 14 and 16 through zener diode 34 until the voltage across terminals 14 and 16 reaches the value of zener diode 36 (assuming that SCR's 24 and 32 are not latched). Moreover, once zener diodes 34 and 36 reach their respective clamped voltages, all of the current then flows through zener diodes 34 and 36 to terminal 16. Thus, the output voltage across terminals 14 and 16 is clamped to the breakdown voltage of zener diode 36.

SCR 32 may be called the output SCR, while SCR 24 may be called the memory SCR. Additionally, SCR 32 may be designed to operate at a substantially higher current than SCR 24. Thus, SCR 24 is less sensitive to voltage variations, but SCR 32 is primarily utilized to rapidly decrease the voltage appearing across terminals 14 and 16.

It is important to note that SCR 32 has a forward voltage thereacross which is taken from the emitter of transistor 43 to the emitter of transistor 45 and is substantially equal to two base emitter voltages ($V_{BE(43)} + V_{BE(44)}$) plus a transistor saturation voltage ($V_{CE(45)}$).

On the other hand, memory SCR 24 has a forward voltage thereacross which is taken from the emitter of transistor 41 to the emitter of transistor 40 and is substantially equal to one base emitter voltage ($V_{BE(41)}$) plus a transistor saturation voltage ($V_{CESAT(40)}$).

In operation, SCR 24 can be latched if the voltage appearing at terminal 18 applies a predetermined voltage to the base of transistor 40 thereby turning on transistor 40. Additionally, SCR 24 can be latched if the voltage appearing at terminal 20 applies a predetermined voltage to the base of transistor 41 to turn on transistor 41. Once SCR 24 is latched, the current at input terminal 12 is shunted to terminal 16 through diode 28 and SCR 24, and the voltage at terminal 12 decreases from the value of the voltage determined by zener diode 36 plus zener diode 34 ($V_{Z(36)} + V_{Z(34)}$) to two base-emitter voltages plus a transistor saturation voltage ($V_{D28} + V_{BE(41)}) + V_{CESAT(40)}$). Further, the latching of SCR 24 begins to discharge the voltage appearing at input terminal 12.

Shortly after SCR 24 becomes latched, the voltage at the anode of diode 28 (input terminal 12) decreases to a predetermined voltage thereby turning on transistor 45 of output SCR 32. That is, memory SCR 24 sinks current through diode 28 which is used to pull down the base of transistor 45 thereby latching (firing) output SCR 32. Thus, SCR 24, which is a smaller and lower current SCR and is less sensitive to dV/dt variations occurring between input terminal 12 and common terminal 16, initially turns on and begins decreasing the voltage across input terminal 12 and common terminal 16. SCR 32 subsequently turns on as a result of SCR 24 being latched and functions to rapidly discharge any capacitance appearing across terminals 14 and 16.

When the voltage at output terminal 14 decreases to a voltage substantially equal to two base emitter voltages plus a transistor saturation voltage ($V_{BE(43)} + V_{BE(44)} + V_{CESAT(45)}$), SCR 32 begins to unlatch. At this time, the voltage at the base of transistor 45 is substantially equal to a base-emitter voltage plus a saturation voltage ($V_{BE(43)} + V_{CESAT(44)}$). It should be noted that the only supply of electrical charge to provide current flow through SCR 32 is stored within the external capacitive load that is coupled across terminals 14 and 16.

However, it must be realized that memory SCR 24 is still active because its forward turn on voltage is only one base emitter voltage plus a saturation voltage. Thus, the voltage at the emitter of transister 40 is substantially equal to $V_{BE(41)} + V_{CESAT(40)}$. Assuming that all transistors have substantially equal base-emitter voltages and collector-emitter saturation voltages, SCR 24 will remain latched by a current that flows from the output terminal 14 through resistor 30 and subsequently through memory SCR 24. It is important to realize that this current flow is made possible because the on-voltage of SCR 32 is greater than the on-voltage of SCR 24. Further, at this time the voltage across diode 28 is substantially equal to zero and diode 28 is momentarily turned off. But, memory SCR 24 remains latched during this transition period due to the current flow from output terminal 14 through resistor 30 to SCR 24. Once this transition period has elapsed, transistor 45 is rendered non-operative and current supplied through input terminal 12 can flow through diode 28 thereby maintaining the latched memory state of SCR. Further, the only way to unlatch (reset) memory SCR 24 is to disable input current applied at input terminal 12.

In summary, what has been shown is a low current memory SCR latch (24) which when activated subsequently activates and latches a higher current output SCR (32). Because the output SCR has a greater forward voltage drop than the memory SCR and because resistor 30 provides a current path from output terminal 14 to SCR 24, the latched state of memory SCR 24 is maintained during the transition period when SCR 32 switches from a latched state to an unlatched state. Thus, SCR 24 remains latched even after SCR 32 is unlatched thereby retaining the memory that SCR 32 was latched. In maintaining the latched condition of SCR 24, input current appearing at input terminal 12 is shunted through diode 28 and SCR 24 to common terminal 16.

By now, it should be apparent from the forgoing discussion that a novel memory circuit has been provided. The memory circuit incorporates a memory SCR and an output SCR. The memory SCR is coupled between the input terminal and the common terminal of the memory circuit wherein the input terminal is the control terminal of the output SCR and the output SCR is coupled across the output terminal and the common terminal of the memory circuit. When the memory SCR latches, it functions to subsequently latch the output SCR. Because the output SCR has a greater forward operating voltage than the memory SCR and by providing a current path from the output terminal to the memory SCR, the memory SCR remains latched during the transition period of when the output SCR goes from a latched state to an unlatched state.

While the invention has been described in conjunction with the specific embodiments thereof, it is evident that many alterations, modifications, and variations will be apparent to those skilled in the art in the light of the foregoing description. Accordingly, it is intended to embrace all such alterations, modifications, and variations in the appended claims.

What we claim is:

1. A device having an input terminal, an output terminal, a common terminal, and first and second control terminals, comprising:

a first SCR having first and second control terminals and first and second terminals, said first control terminal of said first SCR being responsive to a voltage appearing at the first control terminal of the device, said second control terminal of said first SCR being responsive to a voltage appearing at the second control terminal of the device, said second terminal of said first SCR being coupled to the common terminal;

a second SCR having a first control terminal and first and second terminals, said first control terminal of said second SCR being coupled to the input terminal, said first terminal of said second SCR being coupled to the output terminal, said second terminal of said second SCR being coupled to the common terminal;

transition means coupled to the input terminal, to the output terminal and to said first terminal of said first SCR for providing a current path from the output terminal to said first SCR when said second SCR is switching from a latched state to an unlatched state;

a first zener diode having an anode and a cathode, said anode of said first zener diode being coupled to the output terminal, said cathode of said first zener diode being coupled to the input terminal; and a second zener diode having an anode and a cathode, said anode of said second zener diode being coupled to the common terminal, said cathode of said second zener diode being coupled to the output terminal.

2. The device according to claim 1 wherein said transition means includes:

a diode having an anode and a cathode, said anode being coupled to the input terminal, and said cathode being coupled to said first terminal of said first SCR;

a first resistor coupled between said first terminal of said first SCR and the output terminal.

3. The device according to claim 1 wherein said first SCR includes:

a first PNP transistor having a collector, a base and an emitter, said emitter of said first PNP transistor being coupled to said first terminal of said first SCR, said base of said first PNP transistor being coupled to said first control terminal of said first SCR;

a first NPN transistor having a collector, a base and an emitter, said collector of said first NPN transistor being coupled to said base of said first PNP transistor, said base of said first NPN transistor being coupled to said collector of said first PNP transistor and to said second control terminal of said first SCR, and said emitter of said first NPN transistor being coupled to said second terminal of said first SCR;

a second resistor being coupled across said base and emitter of said first PNP transistor; and a third resistor being coupled across said base and emitter of said first NPN transistor.

4. The device according to claim 3 wherein said second SCR includes:

a second NPN transistor having a collector, a base and an emitter, said emitter of said second NPN transistor being coupled to said second terminal of said second SCR;

a third NPN transistor having a collector, a base and an emitter, said collector of said third NPN transistor being coupled to said collector of said second NPN transistor and to said first control terminal of said second SCR, said emitter of said third NPN transistor being coupled to said base of said second NPN transistor;

a second PNP transistor having a collector, a base and an emitter, said collector of said second PNP transistor being coupled to said base of said third NPN transistor, said base of said second PNP transistor being coupled to said collector of said third NPN transistor, and said emitter of said second PNP transistor being coupled to said first terminal of said second SCR;

a fourth resistor being coupled across said base and emitter of said second NPN transistor; and a fifth resistor being coupled across said base and emitter of said third NPN transistor.

5. A device having an input terminal, an output terminal, a common terminal, and first and second control terminals, comprising:

a first SCR having first and second control terminals and first and second terminals, said first control terminal of said first SCR being responsive to a voltage appearing at the first control terminal of the device, said second control terminal of said first SCR being responsive to a voltage appearing at the second control terminal of the device, said second terminal of said first SCR being coupled to the common terminal;

a second SCR having a first control terminal and first and second terminals, said first control terminal of said second SCR being coupled to the input terminal, said first terminal of said second SCR being coupled to the output terminal, said second terminal of said second SCR being coupled to the common terminal;

a diode having an anode and a cathode, said anode being coupled to the input terminal, and said cathode being coupled to said first terminal of said first SCR;

a first resistor coupled between said first terminal of said first SCR and the output terminal;

a first zener diode having an anode and a cathode, said anode of said first zener diode being coupled to the output terminal, said cathode of said first zener diode being coupled to the input terminal; and a second zener diode having an anode and a cathode, said anode of said second zener diode being coupled to the common terminal, said cathode of said first zener diode being coupled to the output terminal.

6. The device according to claim 5 wherein the forward on voltage of said second SCR is greater than the forward on voltage of said first SCR.

7. The device according to claim 6 wherein said first SCR includes:

a first PNP transistor having a collector, a base and an emitter, said emitter of said first PNP transistor being coupled to said first terminal of said first SCR, said base of said first PNP transistor being coupled to said first control terminal of said first SCR;

a first NPN transistor having a collector, a base and an emitter, said collector of said first NPN transistor being coupled to said base of said first PNP transistor, said base of said first NPN transistor being coupled to said collector of said first PNP transistor and to said second control terminal of said first SCR, and said emitter of said first NPN transistor being coupled to said second terminal of said first SCR;

a second resistor being coupled across said base and emitter of said first PNP transistor; and a third resistor being coupled across said base and emitter of said first NPN transistor.

8. The device according to claim 7 wherein said second SCR includes:

a second NPN transistor having a collector, a base and an emitter, said emitter of said second NPN transistor being coupled to said second terminal of said second SCR;

a third NPN transistor having a collector, a base and an emitter, said collector of said third NPN transistor being coupled to said collector of said second NPN transistor and to said first control terminal of said second SCR, said emitter of said third NPN transistor being coupled to said base of said second NPN transistor;

a second PNP transistor having a collector, a base and an emitter, said collector of said second PNP transistor being coupled to said base of said third NPN transistor, said base of said second PNP transistor being coupled to said collector of said third NPN transistor, and said emitter of said second PNP transistor being coupled to said first terminal of said second SCR;

a fourth resistor being coupled across said base and emitter of said second NPN transistor; and a fifth resistor being coupled across said base and emitter of said third NPN transistor.

9. A method for maintaining the state of a memory SCR subsequent to the firing, latching and unlatching of an output SCR, the output SCR being triggered by the memory SCR, the output SCR having a first predetermined forward on voltage, said memory SCR having a second predetermined forward on voltage which is less than said first predetermined forward on voltage of the output SCR, the method comprising the steps of:

(a) latching the memory SCR in response to at least one control signal;

(b) latching the output SCR in response to said latching of said memory SCR; and (c) providing a current path from a first terminal of the output SCR to the memory SCR such that the memory SCR remains latched when the output SCR switches from a latched state to an unlatched state.

* * * * *